(12) United States Patent
Bullen (10) Patent No.: US 10,026,058 B2
(45) Date of Patent: Jul. 17, 2018

(54) ENTERPRISE RESOURCE PLANNING ORIENTED CONTEXT-AWARE ENVIRONMENT

(75) Inventor: Geoffrey Norman Bullen, Copenhagen (DK)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 12/916,072

(22) Filed: Oct. 29, 2010

(65) Prior Publication Data

US 2012/0110579 A1    May 3, 2012

(51) Int. Cl.
*G06F 17/30*    (2006.01)
*G06Q 10/10*    (2012.01)

(52) U.S. Cl.
CPC .................... *G06Q 10/10* (2013.01)

(58) Field of Classification Search
CPC ......... G06F 17/30554; G06F 17/30477; G06F 3/0482; G06F 19/3406; G06F 17/30867; G06F 17/30696
See application file for complete search history.

(56) References Cited

U.S. PATENT DOCUMENTS

| | | | |
|---|---|---|---|
| 6,993,586 B2 * | 1/2006 | Chen et al. | 709/228 |
| 7,156,665 B1 | 1/2007 | O'Connor et al. | |
| 7,243,130 B2 | 7/2007 | Horvitz et al. | |
| 7,463,894 B2 | 12/2008 | Fano et al. | |
| 7,511,682 B2 | 3/2009 | Fuller et al. | 345/1.1 |
| 7,590,651 B2 | 9/2009 | Fujio et al. | |
| 7,603,112 B2 | 10/2009 | Huomo et al. | 455/414.2 |
| 7,694,231 B2 | 4/2010 | Kocienda et al. | |
| 7,788,589 B2 | 8/2010 | Frankel et al. | |
| 8,099,446 B2 | 1/2012 | Carullo et al. | |
| 8,302,096 B2 | 10/2012 | Schulz et al. | |
| 8,707,160 B2 * | 4/2014 | Sadagopan et al. | 715/234 |
| 8,773,352 B1 | 7/2014 | Huang | |

(Continued)

FOREIGN PATENT DOCUMENTS

| | | |
|---|---|---|
| CN | 1537288 A | 10/2004 |
| CN | 1728091 A | 2/2006 |

(Continued)

OTHER PUBLICATIONS

International Search Report for PCT/US2011/056578 dated May 29, 2012.

(Continued)

*Primary Examiner* — Angelica Ruiz
(74) *Attorney, Agent, or Firm* — Mannava & Kang, P.C.

(57) ABSTRACT

An Enterprise Resource Planning (ERP) context-aware environment may be provided. A user's interactions and operations within the context-aware environment may be tracked, recorded, and/or analyzed. Upon receipt of an action request, a context state may be updated. The context state may be analyzed to determine whether the context state is associated with at least one predicted objective. If so, a suggested next action associated with the at least one predicted objective may be provided. The environment may use other context clues to evaluate relative probabilities of each objective and present the suggested next action associated with the highest probability objective.

8 Claims, 4 Drawing Sheets

(56) References Cited

U.S. PATENT DOCUMENTS

| | | | |
|---|---|---|---|
| 2002/0069223 A1 | 6/2002 | Goodisman et al. | |
| 2002/0139859 A1 | 10/2002 | Catan | |
| 2003/0023690 A1 | 1/2003 | Lohtia | |
| 2003/0140088 A1 | 7/2003 | Robinson et al. | 709/202 |
| 2003/0153300 A1 | 8/2003 | Nakao | |
| 2003/0182394 A1 | 9/2003 | Ryngler et al. | |
| 2004/0006593 A1 | 1/2004 | Vogler et al. | 709/203 |
| 2004/0128359 A1 | 7/2004 | Horvitz et al. | |
| 2004/0187140 A1 | 9/2004 | Aigner et al. | |
| 2004/0193943 A1* | 9/2004 | Angelino | H04L 63/1408 714/4.1 |
| 2004/0267750 A1* | 12/2004 | Aaron | 707/9 |
| 2005/0076013 A1* | 4/2005 | Hilbert et al. | 707/3 |
| 2005/0160374 A1 | 7/2005 | Bailey et al. | |
| 2005/0165893 A1 | 7/2005 | Feinberg et al. | |
| 2005/0256844 A1* | 11/2005 | Cristol | G06Q 10/00 |
| 2006/0074730 A1 | 4/2006 | Shukla et al. | |
| 2006/0074844 A1 | 4/2006 | Frankel et al. | |
| 2006/0111990 A1* | 5/2006 | Cohen et al. | 705/32 |
| 2006/0120518 A1 | 6/2006 | Baudino et al. | |
| 2006/0123357 A1 | 6/2006 | Okamura | |
| 2006/0200834 A1 | 9/2006 | Cukierman et al. | |
| 2006/0247915 A1* | 11/2006 | Bradford et al. | 704/1 |
| 2007/0016557 A1 | 1/2007 | Moore et al. | |
| 2007/0019215 A1 | 1/2007 | Yu | |
| 2007/0061022 A1* | 3/2007 | Hoffberg-Borghesani et al. | 700/83 |
| 2007/0061177 A1 | 3/2007 | Thieberger | |
| 2007/0130182 A1 | 6/2007 | Forney | |
| 2007/0136251 A1* | 6/2007 | Colledge et al. | 707/3 |
| 2007/0150466 A1* | 6/2007 | Brave | G06F 17/30867 |
| 2007/0162292 A1 | 7/2007 | Bell | |
| 2007/0162474 A1* | 7/2007 | Parupudi et al. | 707/100 |
| 2007/0185831 A1* | 8/2007 | Churcher | 707/3 |
| 2007/0219979 A1 | 9/2007 | Jung et al. | |
| 2007/0240073 A1 | 10/2007 | McCarthy et al. | |
| 2007/0244738 A1* | 10/2007 | Chowdhary et al. | 705/10 |
| 2007/0250784 A1 | 10/2007 | Riley et al. | |
| 2007/0260751 A1 | 11/2007 | Meesseman | |
| 2007/0266330 A1 | 11/2007 | Friedland et al. | |
| 2007/0273583 A1 | 11/2007 | Rosenberg | |
| 2007/0286113 A1 | 12/2007 | Kirke | |
| 2007/0299713 A1 | 12/2007 | Macbeth et al. | |
| 2008/0045138 A1 | 2/2008 | Milic-Frayling et al. | 455/304 |
| 2008/0059267 A1 | 3/2008 | Hamilton et al. | |
| 2008/0082393 A1 | 4/2008 | Ozzie et al. | 705/10 |
| 2008/0120276 A1* | 5/2008 | Chennavasin | 707/3 |
| 2008/0126310 A1* | 5/2008 | Xu | 707/3 |
| 2008/0126987 A1 | 5/2008 | Meschian et al. | |
| 2008/0168370 A1 | 7/2008 | Maher et al. | |
| 2008/0195388 A1* | 8/2008 | Bower et al. | 704/243 |
| 2008/0195601 A1* | 8/2008 | Ntoulas et al. | 707/5 |
| 2008/0196040 A1 | 8/2008 | Mochel et al. | 719/316 |
| 2008/0207234 A1 | 8/2008 | Arthur et al. | |
| 2008/0281583 A1* | 11/2008 | Slothouber et al. | 704/10 |
| 2008/0306935 A1* | 12/2008 | Richardson et al. | 707/5 |
| 2008/0313000 A1 | 12/2008 | Degeratu | |
| 2009/0099883 A1 | 4/2009 | Wan et al. | |
| 2009/0100407 A1 | 4/2009 | Bouillet | |
| 2009/0144421 A1 | 6/2009 | Bunch | |
| 2009/0171795 A1 | 7/2009 | Clouthier et al. | |
| 2009/0203359 A1 | 8/2009 | Makhoul et al. | |
| 2009/0254399 A1* | 10/2009 | Cristol | G06Q 30/02 705/7.36 |
| 2009/0254971 A1* | 10/2009 | Herz | G06Q 10/10 726/1 |
| 2009/0319562 A1 | 12/2009 | Holm-Petersen et al. | |
| 2010/0010953 A1 | 1/2010 | Meliksetian et al. | |
| 2010/0030845 A1 | 2/2010 | Junghans et al. | |
| 2010/0124946 A1 | 5/2010 | Chun | |
| 2010/0125495 A1 | 5/2010 | Smith et al. | |
| 2010/0131874 A1* | 5/2010 | Linthicum | G06F 19/3487 715/764 |
| 2010/0131916 A1 | 5/2010 | Prigge | |
| 2010/0156812 A1 | 6/2010 | Stallings et al. | 345/173 |
| 2010/0162386 A1 | 6/2010 | Li et al. | |
| 2010/0180200 A1 | 7/2010 | Donneau-Golencer et al. | |
| 2010/0199260 A1 | 8/2010 | Duggal et al. | 717/106 |
| 2010/0211535 A1 | 8/2010 | Rosenberger | |
| 2010/0274859 A1 | 10/2010 | Bucuk | |
| 2010/0281374 A1 | 11/2010 | Schulz et al. | |
| 2010/0293108 A1 | 11/2010 | Gurvitch et al. | |
| 2011/0247030 A1 | 10/2011 | Yarvis et al. | |
| 2011/0264613 A1 | 10/2011 | Yarvis et al. | |
| 2011/0282709 A1 | 11/2011 | Rangaswamy et al. | |
| 2011/0283281 A1 | 11/2011 | Svelov et al. | |
| 2012/0030238 A1* | 2/2012 | DeLuca et al. | 707/777 |
| 2012/0060112 A1* | 3/2012 | Wilson et al. | 715/780 |
| 2012/0108172 A1 | 5/2012 | Bullen | |
| 2012/0110508 A1 | 5/2012 | Bullen | |
| 2012/0054335 A1 | 6/2012 | Kieselbach | |
| 2013/0007793 A1 | 1/2013 | Anthru et al. | |

FOREIGN PATENT DOCUMENTS

| | | |
|---|---|---|
| CN | 101287040 A | 10/2008 |
| CN | 101770512 A | 7/2010 |
| CN | 102521231 A | 6/2012 |
| CN | ZL201110346327.0 | 6/2015 |
| GB | 2391659 A | 2/2004 |
| KR | 10-2004-0093680 | 11/2004 |
| KR | 10-2007-0103623 | 10/2007 |
| WO | 02041160 A1 | 5/2002 |

OTHER PUBLICATIONS

International Search Report for PCT/US2011/056970 dated Jun. 13, 2012.

U.S. Official Action dated Aug. 10, 2012 in U.S. Appl. No. 12/916,087.

U.S. Official Action dated Apr. 10, 2012 in U.S. Appl. No. 12/916,087.

"A Perspective on Information, Knowledge and Context"; Apr. 27, 2010; http://blog.contextdiscovery.com/; 5 pgs.

"ERP/2.60/Projects/UI Technology/Analysis extjs dojo sc"; Sep. 16, 2009; http://wiki.openbravo.com/wiki/ERP/2.60/Projects/UI_Technology/Analysis_extjs_dojo; 8 pgs.

Chen, N.; "Integrating Context-aware Computing in Decision Support System"; Mar. 17-19, 2010; http://www.iaeng.org/publication/IMECS2010/IMECS2010_pp359-364.pdf; 6 pgs.

Chen, Z.; "Application of Context-aware Computing in Manufacturing Execution System"; Sep. 2008; http://ieeexplore.ieee.org/stamp/stamp.jsp?arnumber=04636484; 5 pgs.

Corner, S.; "Context-aware Computing: A $US12 Billion Market in Two Years?"; Nov. 18, 2009; http://www.itwire.com/business-it-news/technology/29436-context-aware-computing-a-us12-billion-market-in-two-years; 2 pgs.

Hurtienne, J.; "Metaphors as Tools for Intuitive Interaction with Technology"; 2007; http://www.metaphorik.de/12/hurtiennebless-ing.pdf; 32 pgs.

Kjeldskov, J.; "Indexical Interaction Design for Context-Aware Mobile Computer Systems"; Sep. 19, 2005; http://conference.icts.sbg.ac.at/mobilehci.icts.sbg.ac.at/context/papers/kjeldskov_paay.pdf; 4 pgs.

Kristiansen, R.; "Model-Based User Interface Design in the Context of Workflow Models"; 2007; http://delivery.acm.org/10.1145/1790000/1782459/p227-kristiansen.pdf?key1=1782459&key2=2253701821&coll=GUIDE&dl=GUIDE&CFID=99595286&CFTOKEN=50739125; 13 pgs.

Miller, N.; "Context-Aware Computing Using a Shared Contextual Information Service"; Apr. 2004; http://www.normsadeh.com/file_download/82/10.1.1.114.2713.pdf; 6 pgs.

Nokia; "Location, Context, and Mobile Services"; Jan. 2009; http://research.nokia.com/files/insight/NTI_Location_&_Context_Jan_2009.pdf; 4 pgs.

Oh, S.; "CAMAR: Context-aware Mobile Augmented Reality in Smart Space"; 2009; http://icserv.gist.ac.kr/mis/publications/data/2009/iwuvr-soh.pdf; 4 pgs.

(56) References Cited

OTHER PUBLICATIONS

Rainier, E.; "*ERP Packages Feature Comparison—New Trends & Techniques in Managing CRM & SAP Projects*"; May 23, 2005; http://it.toolbox.com/blogs/crm-trends/erp-packages-feature-comparison-4309; 11 pgs.
Schmidt, A.; "*Impact of Context-awareness on the Architecture of Learning Support Systems*"; 2007; http://citeseerx.ist.psu.edu/viewdoc/download?doi=10.1.1.75.3371&rep=rep1&type=pdf; 25 pgs.
UI Patterns "*Task driven CRM*"; Feb. 21, 2008; http://ui-patterns.blogspot.com/2008/02/task-driven-crm-synopsis-discussion-on.html; 18 pgs.
Yeung K.; "*A Context-aware System for Mobile Data Sharing in hybrid P2P environment*"; 2009; http://ieeexplore.ieee.org/stamp/stamp.jsp?tp=&arnumber=4976582; 6 pgs.
U.S. Patent Application entitled "*Context-Aware User Interface*" filed Oct. 29, 2010.
U.S. Patent Application entitled "*Enterprise Resource Planning Oriented Context-Aware Environment*" filed Oct. 29, 2010.
U.S. Patent Application entitled "*Personal Digital Context*" filed Oct. 29, 2010.
U.S. Final Office Action dated Aug. 20, 2013 cited in U.S. Appl. No. 12/916,087, 13 pgs.
Chinese First Office Action dated Jan. 6, 2014 cited in Application No. 201110345062.2, 12 pgs.
Chinese First Office Action dated Oct. 15, 2013 cited in Application No. 201110345032.1, 13 pgs.
Chinese First Office Action dated Dec. 4, 2013 cited in Application No. 201110346327.0, 12 pgs.
Chinese Second Office Action dated Aug. 11, 2014 cited in Application No. 201110346327.0, 10 pgs.
U.S. Official Action dated Feb. 28, 2013 in U.S. Appl. No. 12/916,049.
U.S. Official Action dated Feb. 11, 2013 in U.S. Appl. No. 12/916,087.
European Supplementary Search Report dated Feb. 16, 2015 cited in Application No. 11836883.6, 5 pgs.
Chinese Decision on Rejection dated Feb. 28, 2015 cited in Application No. 201110345032.1, 14 pgs.
Chinese Third Office Action dated Apr. 9, 2015 cited in Appln No. 201110345062.2, 13 pgs.
U.S. Office Action dated Apr. 2, 2015 cited in U.S. Appl. No. 12/916,049, 35 pgs.
U.S. Office Action dated May 1, 2015 cited in U.S. Appl. No. 12/916,087, 23 pgs.
U.S. Office Action dated Jan. 2, 2015 cited in U.S. Appl. No. 12/916,087, 32 pgs.
Chinese Fourth Office Action dated Sep. 21, 2015 cited in Appln No. 201110345062.2, 13 pgs.
U.S. Office Action dated Dec. 22, 2015 cited in U.S. Appl. No. 12/916,087, 21 pgs.
Chinese Notice on Grant in Application No. 201110345032.1, dated Dec. 1, 2015m 4 pages.
EP Office Action in Application No. 11866138.8, dated Feb. 4, 2016, 5 pgs.
Chinese Fifth Office Action and Search Report Issued in Application No. 201110345062.2, dated Mar. 15, 2016, 13 Pages.
EP Supplementary Search Report issued Application No. 11836869.5, dated Apr. 28, 2016, 7 Pages.
Chinese Final Office Action in Application No. 201110345062.2 dated Jul. 13, 2016, 8 Pages.
U.S. Appl. No. 12/916,087, Final Office Action dated May 25, 2016, 20 pages.
Chinese Second Office Action dated Apr. 30, 2014 cited in Application No. 201110345032.1, 13 pgs.
Chinese Fourth Office Action dated Sep. 2, 2015 cited in Appln No. 201110345032.1, 6 pgs.
U.S. Office Action dated Sep. 29, 2015 cited in U.S. Appl. No. 12/916,049, 29 pgs.
U.S. Final Office Action dated Sep. 9, 2014 cited in U.S. Appl. No. 12/916,049, 41 pgs.
U.S. Official Action dated Oct. 18, 2012 in U.S. Appl. No. 12/916,049.
Chinese Second Office Action dated Sep. 22, 2014 cited in Application No. 201110345062.2, 19 pgs.
Chinese Third Office Action dated Oct. 8, 2014 cited in Application No. 201110345032.1, 14 pgs.
U.S. Final Office Action dated Jul. 30, 2014 cited in U.S. Appl. No. 12/916,087, 27 pgs.
European Communication dated Apr. 25, 2014 (with Supplementary Search Report) cited in Application No. 11866138.8, 5 pgs.
International Search Report and Written Opinion for PCT/US2011/054611 dated Sep. 27, 2012.
U.S. Office Action dated Mar. 25, 2014 cited in U.S. Appl. No. 12/916,087, 33 pgs.
U.S. Office Action dated Apr. 21, 2014 cited in U.S. Appl. No. 12/916,049, 45 pgs.

\* cited by examiner

ENTERPRISE RESOURCE PLANNING ORIENTED CONTEXT-AWARE ENVIRONMENT

BACKGROUND

An Enterprise Resource Planning (ERP) context-aware environment is a process for creating a task-oriented environment that may utilize contexts to improve human and machine decision-making processes. In some situations, ERP systems may contain vast amounts of information that may be valuable in making business decisions and solving problems, but this data may be difficult to access and/or understand. Furthermore, the information may not be readily-available to non-ERP system users, and information associated with one ERP process may not be accessible or related to data used by other ERP processes. For example, data used in a human resources process may not be related to data used by an accounting process, resulting in less than fully informed decisions made by differing departments.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An Enterprise Resource Planning (ERP) context-aware environment may be provided. Upon receipt of an action request, a context state may be updated. The context state may be analyzed to determine whether the context state is associated with at least one predicted objective. If so, a suggested next action associated with the at least one predicted objective may be provided.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

An Enterprise Resource Planning (ERP) context-aware environment may be provided. Consistent with embodiments of the present invention, a user's interactions and operations within a software environment may be tracked, recorded, and/or analyzed. For example, an employee associated with a business organization may use the software environment to achieve a certain objective that requires access to business data, such as a human resources manager producing a report summarizing current employee benefit choices. The context-aware environment may track each action requested by the employee, such as retrieving a list of all employees, retrieving a list of all available benefit choices, and mapping each employee to one or more choices. The environment may thus associate these requested actions, in this order, with the objective of creating a benefit choice summary report. The next time the employee, or another human resources employee, begins requesting these or similar actions, the environment may suggest the next action in the sequence for achieving the same objective.

As more users in different roles achieve their objectives, an objective prediction database may be expanded. Although individual action requests may be associated with multiple objectives, the environment may use other context clues to evaluate relative probabilities of each objective and present a suggested next action associated with the highest probability objective. Consistent with embodiments of the invention, multiple suggested next actions may be presented, in a descending order of probability for example. A context clue may comprise the user's department or known role, such as accounting or human resources. A user in accounting who begins a task with pulling up an employee list may have a higher probability of trying to achieve an objective of producing a payroll report, while the human resources user may have a higher probability associated with a benefits summary.

Figure 1:
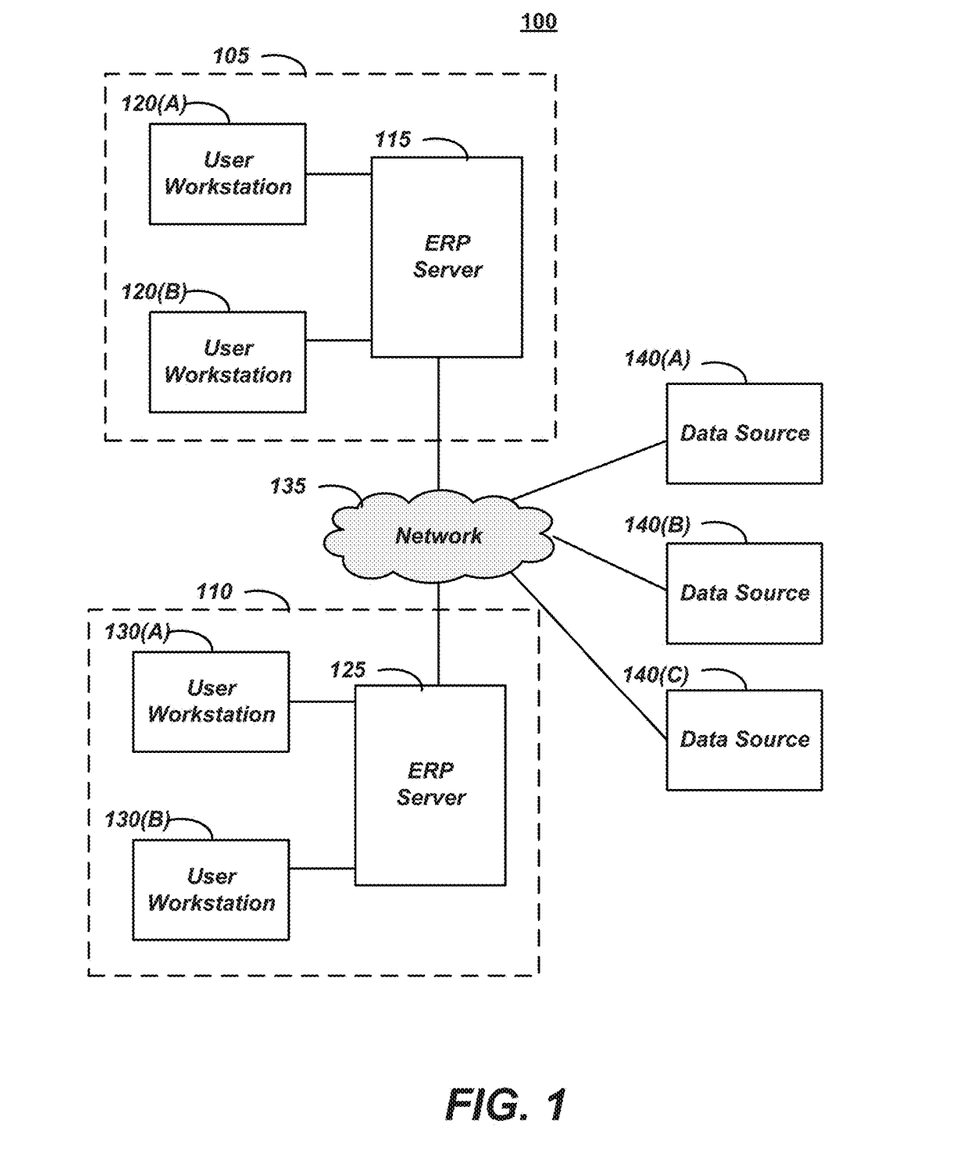
FIG. 1 is a block diagram of an operating environment.

FIG. 1 is a block diagram of an operating environment 100 comprising a first organization 105 and a second organization 110. First organization 105 may comprise a first Enterprise Resource Planning (ERP) server 115 and a first plurality of user workstations 120(A)-(B). Second organization 110 may similarly comprise a second Enterprise Resource Planning (ERP) server 125 and a second plurality of user workstations 130(A)-(B). User workstations 120(A)-(B) and 130(A)-(B) may be coupled to respective ERP servers 115 and 125, such as by a local area network (LAN). First organization 105 and second organization 110 may be communicatively coupled via a network 135. Network 135 may comprise a private network and/or a public network such as the Internet. Operating environment 100 may further comprise a plurality of data sources 140(A)-(C). Data sources 140(A)-(C) may comprise organization-specific data sources, such as an offsite data storage and/or backup facility, public data sources, such as a stock market quote service and/or a weather data service, and/or subscription, partner, customer, and/or client data sources. For example, data source 140(A) may be associated with an insurance company providing health care benefits to first organization 105 and/or second organization 110.

Figure 2:
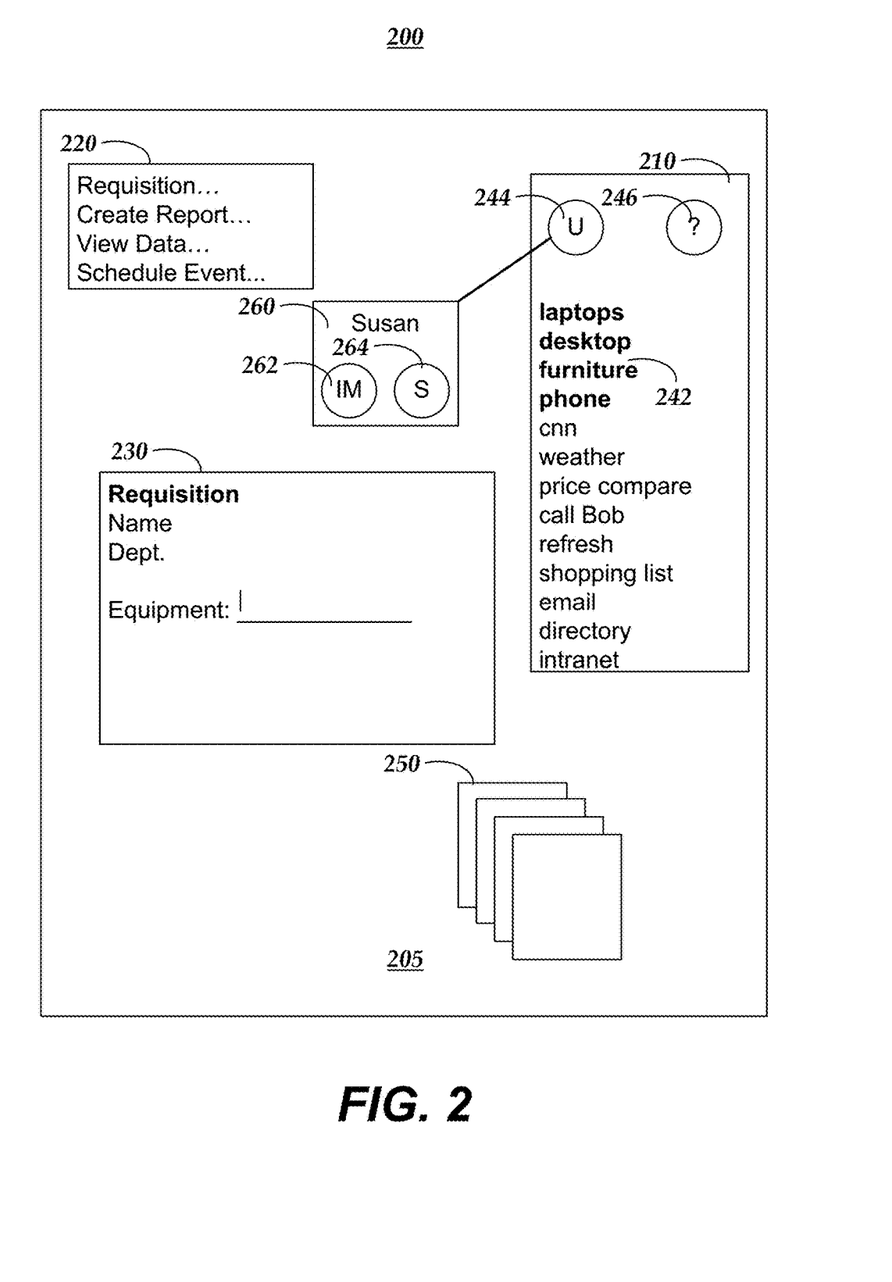
FIG. 2 is a block diagram of an interface for providing a suggested next action in a context-aware environment.

FIG. 2 is a block diagram of an interface 200 for providing a suggested next action in a context-aware environment comprising a workspace 205, a suggestion list 210, an action list 220, a current task window 230, and a book display 250. Suggestion list 210 may comprise, for example, a plurality of context-related suggestions 242 and a plurality of option buttons such as a user-related suggestion button 244 and a workflow-related suggestion button 246. Selection of user-related suggestion button 244 may cause suggestion list 210 to be populated with users associated with similar contexts. Selection of one of the users may cause a user window 260 to be displayed comprising a contact user button 262 and/or a share workspace button 264. Interface 200 is described in greater detail in related application having Ser. No. 12/916,049 and entitled "Enterprise Resource Planning Oriented Context-Aware User Interface", which is incorporated by reference herein in its entirety.

Figure 3:
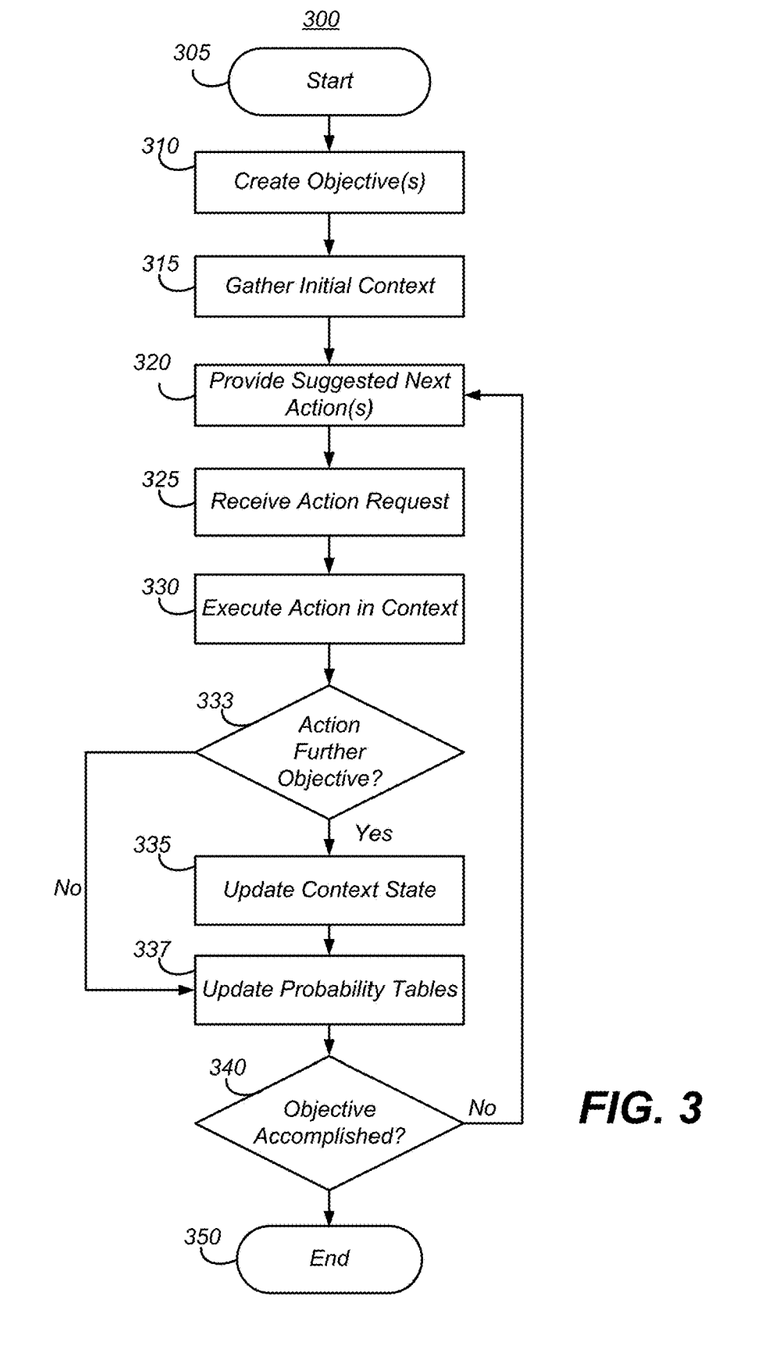
FIG. 3 is a flow chart of a method for providing a context-aware environment.

FIG. 3 is a flow chart setting forth the general stages involved in a method 200 consistent with an embodiment of the invention for providing can ERP context-aware environment. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may create a plurality of objectives. For example, an objective may be represented by a final goal associated with and/or defined by a set of actions taken to accomplish that goal. The creation of the objective(s) may be in response to receiving a first action request from a user, such as initializing a report creation application and/or tool. The initializing of the tool may result in one or more objectives in the form of reports that may be created within the tool being created and/or displayed as options to the user. For another example, a user of user workstation 120(A) may request a list of employees from an organizational database associated with first ERP server 115. In response to this request, a list of objectives associated with viewing and/or managing the employee list may be created and/or displayed.

From stage 310, method 300 may advance to stage 315 where computing device 400 may create an initial context state associated with the user according to the first action request. The context state may comprise information associated with the user, such as a role associated with the user, at least one previous user objective, at least one previous user action request, a location of the user, a time, a date, a category associated with the first action request from the user, a data type associated with the first action request from the user, and a data category associated with previous user action requests. For example, the context state associated with the user requesting the list of employees may comprise the user's role within first organization 105 (e.g., a Human Resources Director), the data type (e.g., employee data), and/or a date (e.g., the first day of the quarter).

From stage 315, method 300 may advance to stage 320 where computing device 400 may provide a suggested next action. For example, the user may explicitly select one of the displayed objectives from stage 310, and user workstation 120(A) may display the next step associated with accomplishing that objective. For another example, user workstation 120(A) and/or first ERP server 115 may compare the initial context state to a plurality of user context states stored in a database, each of which is associated with at least one of the plurality of objectives. Each of the stored context states may be associated with a probability calculated according to this comparison; the closer the match between the user's current context state and the stored context state, the higher the associated probability may be. For example, a stored context state associated with the same HR Director user, comprising the same requested action (i.e., requesting the employee list), and occurring on the first day of the previous quarter may comprise a very high probability (e.g., 95%). A stored context state and predicted action associated with another user of the organization (e.g., a user in the legal department) who performed the same action request may be associated with a lower probability (e.g., 60%). Actions associated with the identified objective(s) may then be displayed to the user as suggestions. For example, user workstation 120(A) may display a prompt and/or highlight a menu item associated with the suggested next action. Consistent with embodiments of the invention, if a plurality of predicted objectives are determined to be associated with the user's current context state, a list of the predicted objectives may be displayed, in decreasing order according to the associated probability, for example.

From stage 320, method 300 may advance to stage 325 where computing device 400 may receive an action request. For example, the user may drag an action from action list 230 to workspace 205 and/or may launch a new application.

From stage 325, method 300 may advance to stage 330 where computing device 400 may execute the action request according to the current context. For example, the context may be provided as a data structure to a process associated with executing the action request, such as by passing the user's employee ID and department code from the context along with a request to open an equipment requisition form so that the form may be prepopulated with the relevant information. Execution of the requested action may also result in the creation of a new context and/or an update to the user's existing context, such as where a user selects a particular field in a form, indicating interest in that field.

From stage 330, method 300 may advance to stage 333 where computing device 400 may determine whether the requested action furthers accomplishing at least one of the plurality of objectives. For example, requesting performance of a suggested action provided at stage 320 may be determined to be in furtherance of a predicted objective. This determination may be explicit, such as where the user affirmatively selects an approve/disapprove option, or implicit, such as where the user performs an "undo" of the requested action.

From stage 333, method 300 may advance to stage 335 where computing device 400 may update the context state according to the action request. For example, if the user launched a new application, this action may be added to a workflow recording associated with the context state. Workspace 205 may be also be updated, such as by rearranging and/or resizing open windows to allow the new application to be displayed alongside other information. Similarly, if a new context element was created in the previous stage, such as the user's denoted interest in a particular form field, that information may be added to the user's context.

From stage 335, method 300 may advance to stage 337, where computing device 400 may update a probability table. For example, if the user selects a suggested action to perform, a probability associated with that action when attempting to perform one of the plurality of objectives may be increased. Conversely, if the user rejects the suggested action, the associated probability may be decreased.

From stage 337, method 300 may advance to stage 340 where computing device 400 may determine whether the objective has been completed. For example, the selected objective may be associated with a final action of "print the report". If the objective is associated with actions that have not yet been performed, method 300 may return to stage 320 where computing device 400 may provide the next suggested action. Otherwise, once the user has selected the final action, method 300 may end at stage 350.

An embodiment consistent with the invention may comprise a system for providing a context-aware environment. The system may comprise a memory storage and a processing unit coupled to the memory storage. The processing unit may be operative to receive an action request, update a context state according to the action request, determine whether the context state comprises a completed objective, and, in response to determining that the context state does not comprise the completed objective, provide a suggested next action associated with achieving the objective. The action request may be received, for example, from a user. The context state may be specific to the user and/or may be shared among multiple users. The predicted objective may be derived from a previous objective performed by the user and/or another user within the user's organization, such as where the user is generating a periodic report.

The processing unit may be further operative to receive a second action request, determine whether the second action request comprises the suggested next action, and, if so, provide a second suggested next action associated with the desired objective. As action requests are received, the processing unit may be operative to store the context state in a prediction database. The processing unit may also be operative to increase a probability factor associated with the desired objective if the second request does comprise the suggested next action and/or decrease the probability factor associated with the desired objective if the second request does not comprise the suggested next action. The probability factors may be associated with the context states as stored in the prediction database. The context states in the prediction database may be categorized according to objectives associated with each context state. For example all objectives associated with generating a report may be in one category, which may be subdivided into sub-categories such as HR reports, accounting reports, sales reports, etc.

Another embodiment consistent with the invention may comprise a system for providing a context-aware environment. The system may comprise a memory storage and a processing unit coupled to the memory storage. The processing unit may be operative to receive a first action request from a user, identify a current context associated with the user, provide a first suggested next action according to a predicted objective associated with the current context to the user, receive a second action request from the user, determine whether the second user action request comprises the suggested next action, and, if so, provide a second suggested next action associated with a predicted objective to the user. For example, the first action may comprise a request from the user to open a requisition form. The system may analyze the user's current context, which may comprise information about the user such as name, organizational department, and a recent browsing history from a web browser including several laptop comparisons. Based on this context, the system may provide a suggested action that, with a single selection such as a double click and/or a drag-and-drop, allows the user to populate the requisition form with the user's details and specify that the requisition is for a new laptop. The processing unit may be further operative to display a list of at least a subset of a plurality of predicted objectives, which may be ordered according to a decreasing probability. For example, the user's recent search history may give a laptop requisition a higher probability than a desktop computer requisition, but both suggestions may be displayed, such as in suggestion list 210.

Yet another embodiment consistent with the invention may comprise a system for providing a context-aware environment. The system may comprise a memory storage and a processing unit coupled to the memory storage. The processing unit may be operative to create a plurality of objectives, gather a context state associated with a user, provide a suggested action associated with at least one of the plurality of objectives according to the context state, receive an action request from the user, execute the requested action according to the context state, and determine whether the action is associated with accomplishing the at least one of the plurality of objectives, wherein being operative to determine whether the context state is associated with accomplishing the at least one predicted objective comprises being operative to compare the context state to a plurality of user context states each associated with the at least one of the plurality of objectives. In response to determining that the action is associated with accomplishing the at least one of the plurality of objectives, the processing unit may be operative to update the context state, update a probability associated with the suggested action, determine whether the context state comprises a completed objective of the plurality of objectives, and, in response to determining that the context state does not comprise the completed objective, provide at least one second suggested action. The context state may comprise, for example, a role associated with the user, at least one previous user objective, at least one previous user action request, a location of the user, a time, a date, a category associated with the first action request from the user, a data type associated with the first action request from the user, and a data category associated with previous user action requests.

Figure 4:
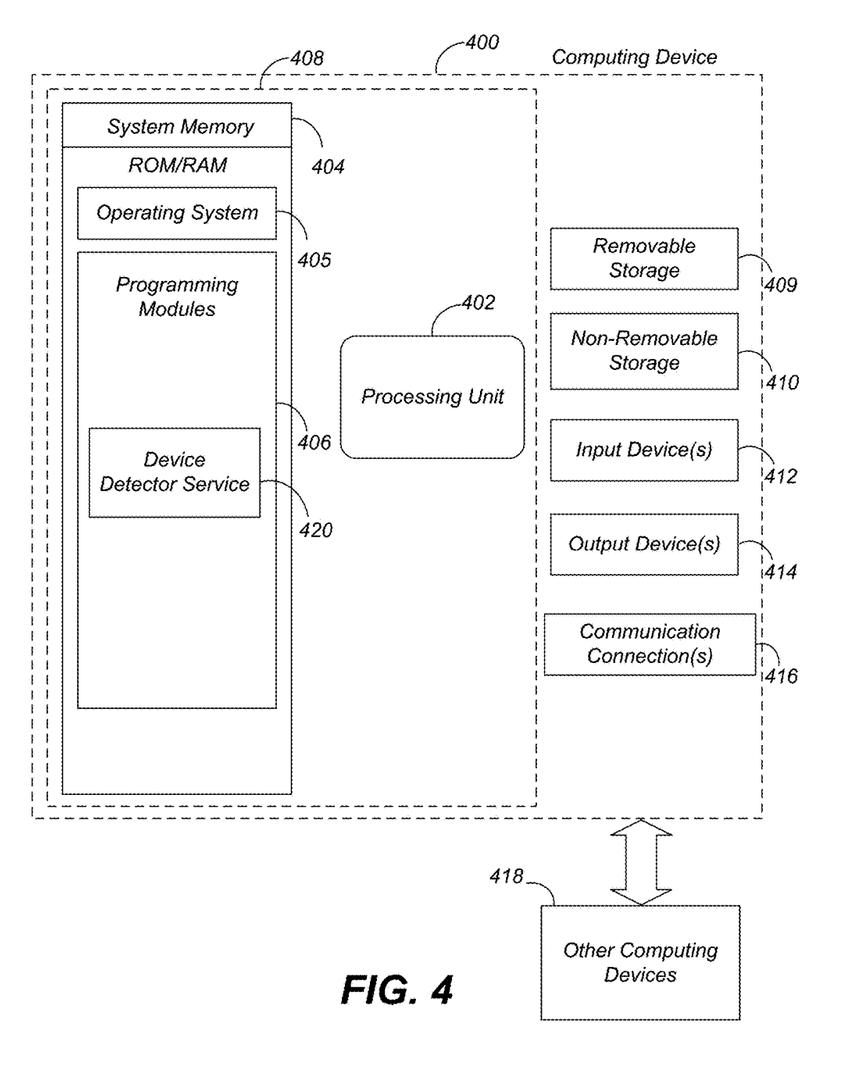
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a Device Detector Service 420. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. Device Detector Service 420) may perform processes including, for example, one or more of method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a context-aware environment, the method comprising:
   receiving a first action request from a user;
   displaying a plurality of objectives created in response to receiving the first action request from the user;
   determining whether the first action request completes any of the plurality of objectives;
   in response to determining that the first action request does not complete any of the plurality of objectives, providing a first suggested next action based on a current context state and the plurality of objectives, wherein providing the first suggested next action comprises:
      determining a probability factor for each of the plurality of objectives from the current context state based on the first action request,
      determining the first suggested next action in furtherance of each of the plurality of objectives from the current context state, and
      providing the first suggested next action corresponding to one of the plurality of objectives having the highest probability factor;
   in response to the first suggested next action having been executed, updating the current context state and determining whether the one of the plurality of objectives is completed;
   if the one of the plurality of objectives is not completed, determining another next action based on the updated current context state and in furtherance of the one objective;
   receiving a second action request;
   determining whether the second action request comprises the first suggested next action;
   in response to determining that the second action request comprises the first suggested next action, providing a second suggested next action; and
   in response to determining that the second action request comprises the first suggested next action, increasing the probability factor associated with the one of the plurality of objectives.

2. The method of claim 1, wherein the first action request is received from a user.

3. The method of claim 1, wherein the plurality of objectives are associated with the user.

4. The method of claim 1, wherein the plurality of objectives are associated with an organization.

5. The method of claim 1, further comprising:
   in response to determining that the second action request does not comprise the first suggested next action:
      decreasing the probability factor associated with one of the plurality of objectives;
      determining whether the second action request is associated with a completion of another of the plurality of objectives; and
      in response to determining that the second action request is not associated with the completion of the another of the plurality of objectives, providing the second suggested next action.

6. The method of claim 1, further comprising storing the current context state in a prediction database.

7. The method of claim 6, wherein the prediction database comprises an aggregation of a plurality of context states, wherein each of the plurality of context states is associated with a user.

8. The method of claim 7, further comprising categorizing each of the plurality of context states according to the plurality of objectives associated with each of the plurality of context states.

* * * * *